United States Patent [19]
Bosworth

[11] Patent Number: 5,799,784
[45] Date of Patent: Sep. 1, 1998

[54] COMPACT DISK RECORD CASE

[76] Inventor: John Bosworth, 601 N. Broadway, Upper Nyack, N.Y. 10960

[21] Appl. No.: 769,545

[22] Filed: Dec. 19, 1996

[51] Int. Cl.⁶ .................................................. B65D 85/57
[52] U.S. Cl. ................................. 206/308.1; 206/310
[58] Field of Search ............................ 206/307, 308.1, 206/309, 310, 312, 232

[56] References Cited

U.S. PATENT DOCUMENTS

| | | | |
|---|---|---|---|
| 5,360,106 | 11/1994 | Nakayama et al. | 206/308.1 |
| 5,360,107 | 11/1994 | Chasin et al. | 206/308.1 |
| 5,377,825 | 1/1995 | Sykes et al. | 206/310 |
| 5,511,659 | 4/1996 | Bosworth | 206/308.1 |
| 5,551,560 | 9/1996 | Weisburn et al. | 206/310 |
| 5,662,216 | 9/1997 | Nesbitt et al. | 206/308.1 |

*Primary Examiner*—David T. Fidei
*Attorney, Agent, or Firm*—H. Gibner Lehmann; K. Gibner Lehmann

[57] ABSTRACT

A case for CD records consists of a low, flat rectangular box-like tray having four low, upstanding side walls. Two, somewhat crescent-shaped cover members are slidably mounted on the tray and together define a large circular access opening which enlarges to either receive or else release for use the record when the cover members are separated an extent. When brought together, the cover members can hold a record captive. The tray carries an inexpensive insert member which is formed to nest and protect the record. The insert member has large cutouts which save material while at the same time provide opportunities for copy display and ornamentation of the case. The tray and insert provide both central and peripheral support for the record, as well as protection of the playing surface, by virtue of their unique configuration.

16 Claims, 5 Drawing Sheets

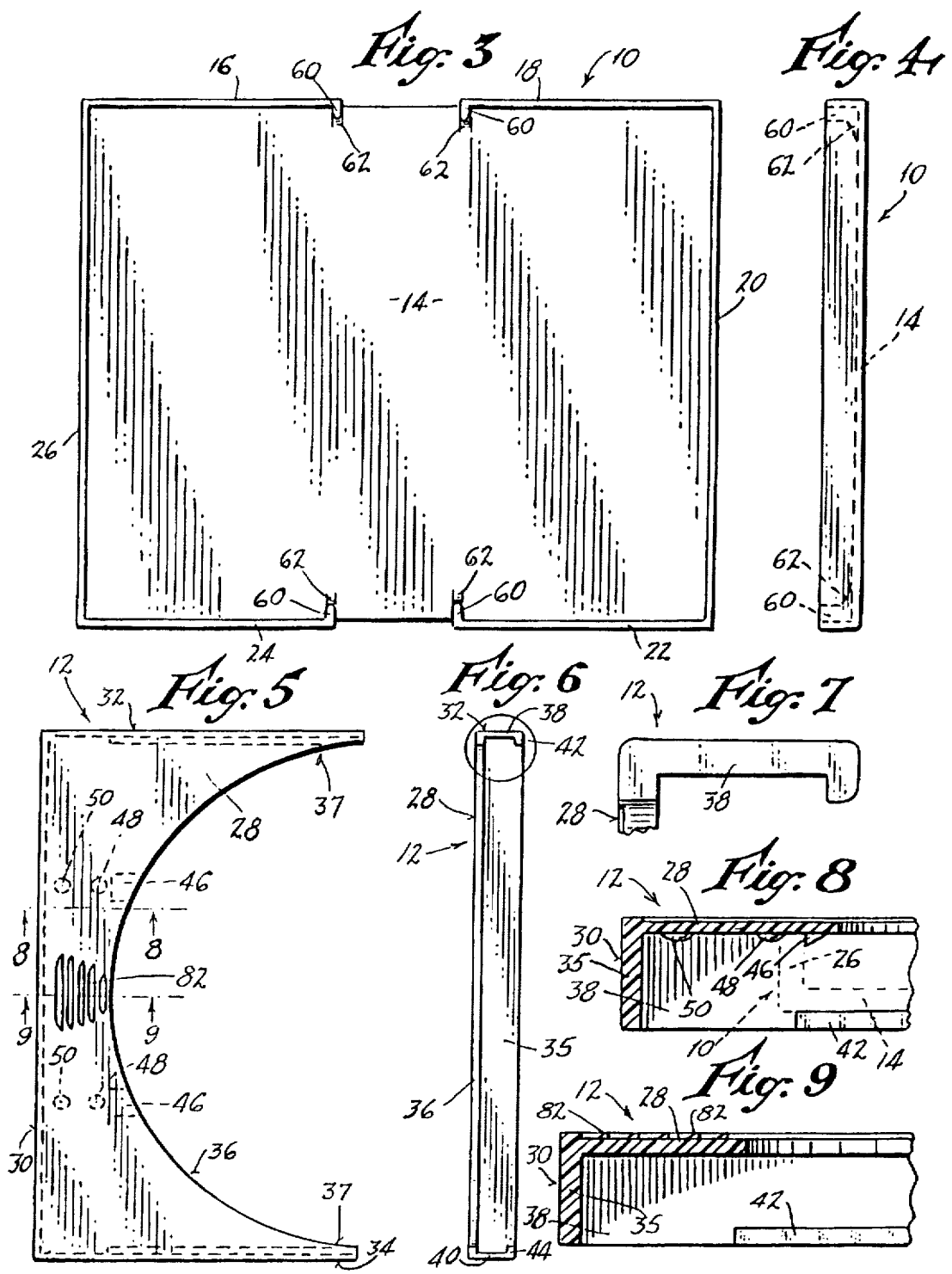

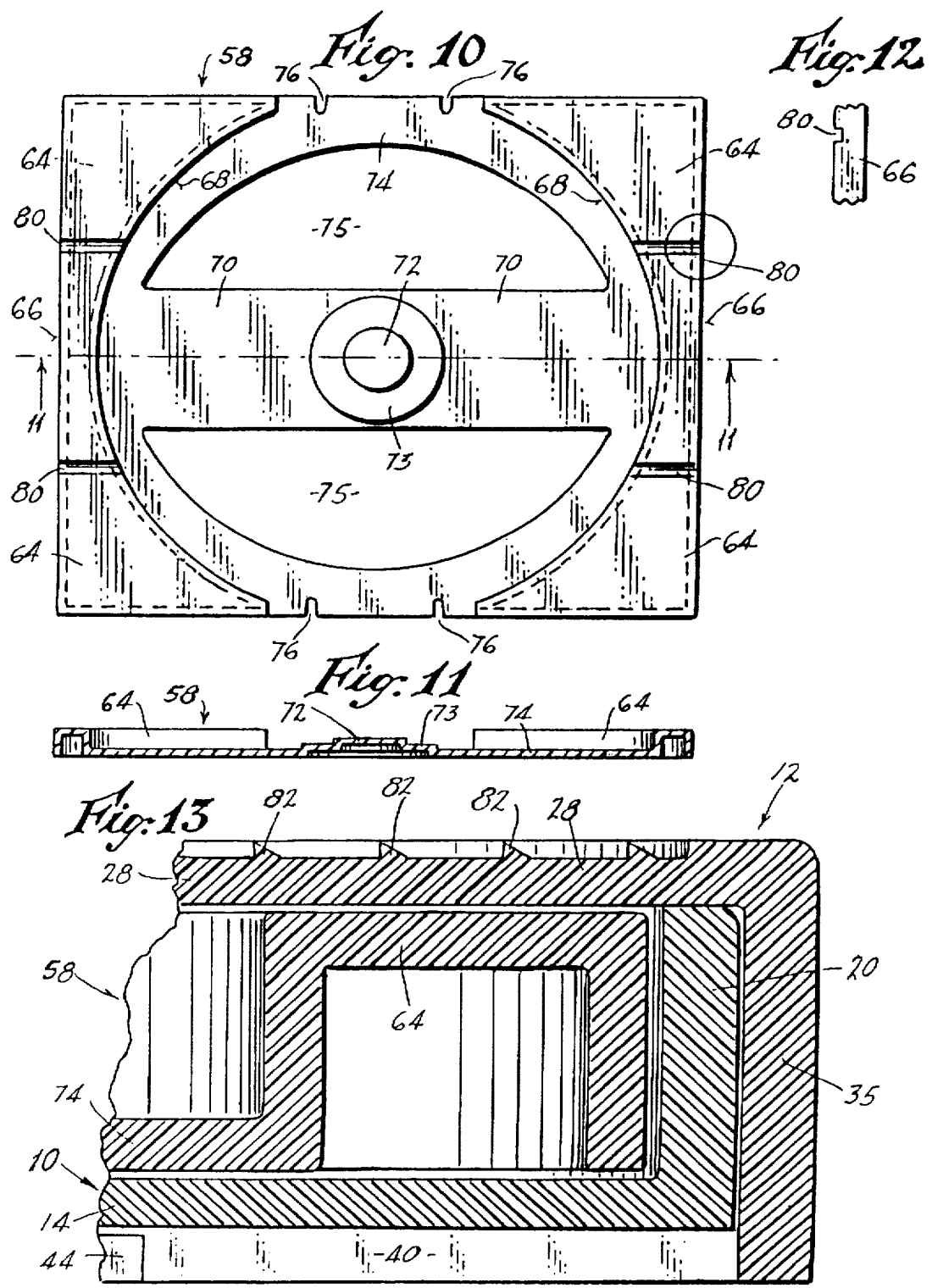

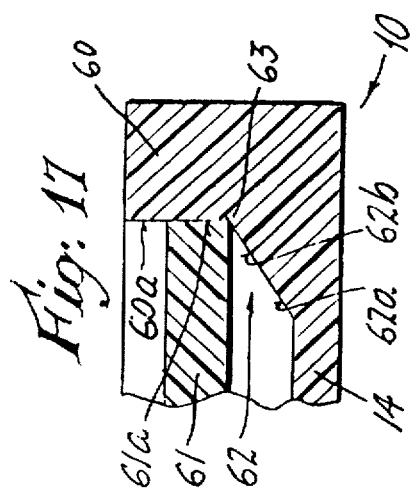

COMPACT DISK RECORD CASE

CROSS REFERENCES TO RELATED APPLICATIONS/PATENTS

1. My U.S. Pat. No. 5,511,659 dated Apr. 30, 1996, and entitled COMPACT DISK RECORD CASE.

2. My co-pending application U.S. Ser. No. 08/532,478 filed Sep. 22, 1995, and entitled COMPACT DISK RECORD CASE. Priority under 35 USC 120 of Ser. No. 08/532,478 is hereby claimed in the present application.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates generally to plastic cases for storage and display of compact disk records.

2. Description of the Related Art Including Information Disclosed Under 37 CFR Sections 1.97–1.99

In particular, the invention relates to additional refinements in the construction illustrated and described in my U.S. Pat. No. 5,511,659 above identified.

Specific reference is made to the patent, which contains a brief discussion of known prior devices in the compact disk field. In addition to the subject matter noted in that patent, other compact disk packaging arrangements are disclosed in U.S. Pat. Nos. 4,899,875; 5,265,721; and 5,383,553.

Pat. No. '875 illustrates several examples of CD casings, mostly involving carrier trays of one form or another and which are adapted to be insertable in an outer housing, in the manner of a drawer. A total of 4 embodiments is disclosed. One relates to a rigid tray that has a semi-circular recess to receive the compact disk, and which can be slidably inserted into the open end of the outer, slab-like housing. Other embodiments relate to various types of foldable tray constructions, all of which appear to be relatively complex in construction. There is generally disclosed the use of hinged door structures to close off the housings.

However, it has been determined that such hinges very often are inadvertently broken by the consumer, as a result of his haste or impatience, or a lack of understanding of the particular structures involved.

Yet another hinged casing is illustrated in Pat. No. '721. This suffers from the same disadvantages, namely complexity in the construction, and the likelihood of inadvertent breakage.

A still further casing structure is shown in Pat. No. '553. The potential problems noted above in connection with hinged structures has, for a large part, rendered some prior casing structures unworkable. In spite of this, the jewel cases currently on the market are of a hinged-type almost exclusively, and have surprisingly enjoyed a considerable degree of commercialization.

In some prior constructions, there also existed the possibility of inadvertent scratching of the CD record surface, often causing permanent damage to the data/recorded material contained thereon.

Finally, with just about all existing casings the consumer experiences difficulty in use; the casings are fragile, and often difficult to open and close. The provision of multiple detents for hinged casings, coupled with a requirement to insert one's fingernail and pry open a casing, are at best, a compromise solution to the problem of convenient, inexpensive display and storage of compact disk records.

SUMMARY OF THE INVENTION

The above drawbacks and disadvantages of prior CD record cases are largely obviated by the present invention, which has for one object the provision of a novel and improved CD record case which is extremely easy to use, and is both simple in its structure and economical to fabricate.

Still another object of the invention is to provide an improved CD case of the kind indicated, which is constituted of as few separate pieces as possible, and wherein the component parts thereof can be readily produced in relatively simple plastic mold cavities.

Yet another object of the invention is to provide an improved CD case in accordance with the foregoing, which eliminates the need for hinges of all types, thereby completely circumventing the problems normally associated with hinges, such as inadvertent breakage, separation, warping, or the like.

A still further object of the invention is to provide an improved CD case as above set forth, which can be readily opened to provide immediate access to the CD record, and thereafter closed following removal of the record, with virtually no possibility of inadvertent breakage from overstressing of any of the parts, and with virtually no possibility of inadvertent damage to the recording surface of the CD record per se.

Still another object of the invention is to provide an improved CD case as above characterized, which is especially eye-catching in its physical appearance, and thus possesses inherent advantages over prior cases, from the standpoint of encouraging successful marketing or promotional efforts.

Yet another object of the invention is to provide an improved CD case of the type noted above, which provides increased flexibility as to different types of insert cards/and or advertising/promotional material to be included in the case, all without disruption to the intended storage and display functions inherent in the case.

Still another object of the invention is to provide an improved CD case as outlined above, which utilizes a minimum of plastic substance, thereby keeping the overall cost as low as possible, and ultimately reducing problems associated with disposal and/or recycling of plastic waste material.

Yet another object of the invention is to provide an improved and simplified CD mailing case which is inexpensive to produce and reliable in use.

The above objects are accomplished by a case for a compact disk record, comprising in combination a flat, rectangular molded plastic tray having low, oppositely-disposed side walls, the tray being adapted to receive broadside and to hold the compact disk record. The tray contains a plurality of integrally-molded spaced-apart shoulders which are adapted to engage peripheral edge portions of the disk record and to centralize it in the tray. The arrangement is such that peripheral edge portions of the record are held spaced from the side walls of the tray. Openable cover means carried by the tray provide access thereto. The cover means when closed, retains the compact disk record in the tray.

The objects are further accomplished by a case for a compact disk record, comprising in combination a flat, rectangular tray having low, oppositely-disposed side walls, a nest member in the tray comprising a nesting formation which is adapted to receive broadside and to hold a compact disk record, and a pair of cover members carried by the tray at one side thereof. There are further provided cooperable slide mounting means on the tray and one of the cover members, mounting the one cover member for movement in a plane which is common with the other cover member. The mounting means enables one cover member to be moved in the common plane toward and away from the nest formation of the nest member. The cover members together have a pair of edges that face each other, and portions of the facing edge of one member overlie areas of the nest formation of the nest member when the cover member is closest to the nest formation, thereby to hold captive a disk record that has been previously inserted in the nest formation.

The arrangement is such that the case can be easily and quickly opened by the user, utilizing a simple grasp and slide motion, and without the need to pry apart slab-like structures with one's fingernail or the like. Jamming and/or binding of the slide components does not occur, and the CD record is immediately accessible to the user within a matter of typically one second or less, from the time that he initially grasps the case.

There are no hinges to break, and no critical parts requiring special manipulation, as with the existing jewel cases currently found in the marketplace.

Also, significantly improved ease of use is realized by the provision of novel support shoulder and ramp structures, which enhance the ability of the user to insert and properly position a CD record in the tray of the invention, and with substantially complete freedom from inadvertent damage occurring to the CD record surface.

Excellent reliability and ease of use by the consumer are thus realizeable.

BRIEF DESCRIPTION OF THE DRAWINGS

In the accompanying drawings:

FIG. 3 is a top plan view of the flat box or tray component of the CD case.

FIG. 4 is a side edge view of the tray component of FIG. 3.

FIG. 5 is a top plan view of a slide cover member of the CD case.

FIG. 6 is an inner elevational view of the cover member of FIG. 5.

FIG. 7 is a detail, enlarged, of the circled portion of the cover member seen in FIG. 6.

FIG. 8 is an enlarged sectional view of the cover member, taken on the line 8—8 of FIG. 5.

FIG. 9 is an enlarged sectional view of the cover member, taken on the line 9—9 of FIG. 5.

FIG. 10 is a plan view of an insert component of the CD case.

FIG. 11 is a diametric sectional view of the insert component, taken on the line 11—11 of FIG. 10.

FIG. 12 is a fragmentary side elevational view of the insert component taken at the encircled portion of FIG. 10.

FIG. 13 is an enlarged fragmentary sectional view of the CD case, taken on the line 13—13 of FIG. 2.

FIG. 17 is a fragmentary section taken through one of the centralizing shoulders of the tray, where the insert component is not utilized, but instead the CD record is placed directly in and supported by the tray itself.

DESCRIPTION OF THE PREFERRED EMBODIMENT

The present invention concerns improvements in the CD case illustrated and described in my U.S. Pat. No. 5,511,659 dated Apr. 30, 1996, and entitled COMPACT DISK RECORD CASE.

The entire disclosure of U.S. Pat. No. 5,511,659 above identified is specifically incorporated herein, by reference.

Basically the present improved CD case or package, as well as that in my copending application identified above, comprises a unique combination in the form of a flat, slab-like assemblage constituted of three molded or otherwise formed plastic components which are slidably related to each other, two of said components being cover pieces and essentially duplicates of each other, and the third comprising a box-like member or tray. In addition to these three, there is a formed component constituting an insert which functions as a nest for the CD record. The above four components are uniquely inter-related to provide advantages that are particularly pointed out below in detail.

Figure 1:
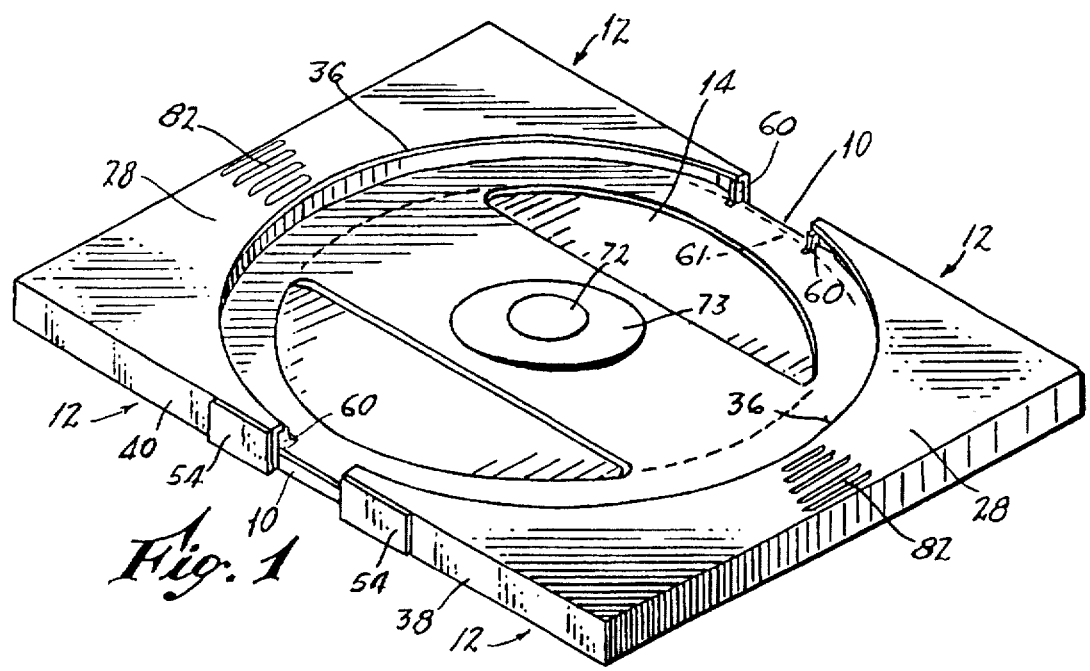
FIG. 1 is a perspective view of the improved CD record case in its open position, as provided by the invention, and illustrating in fragmentary dotted outline, a portion of a CD record in position in the case.
Figure 2:
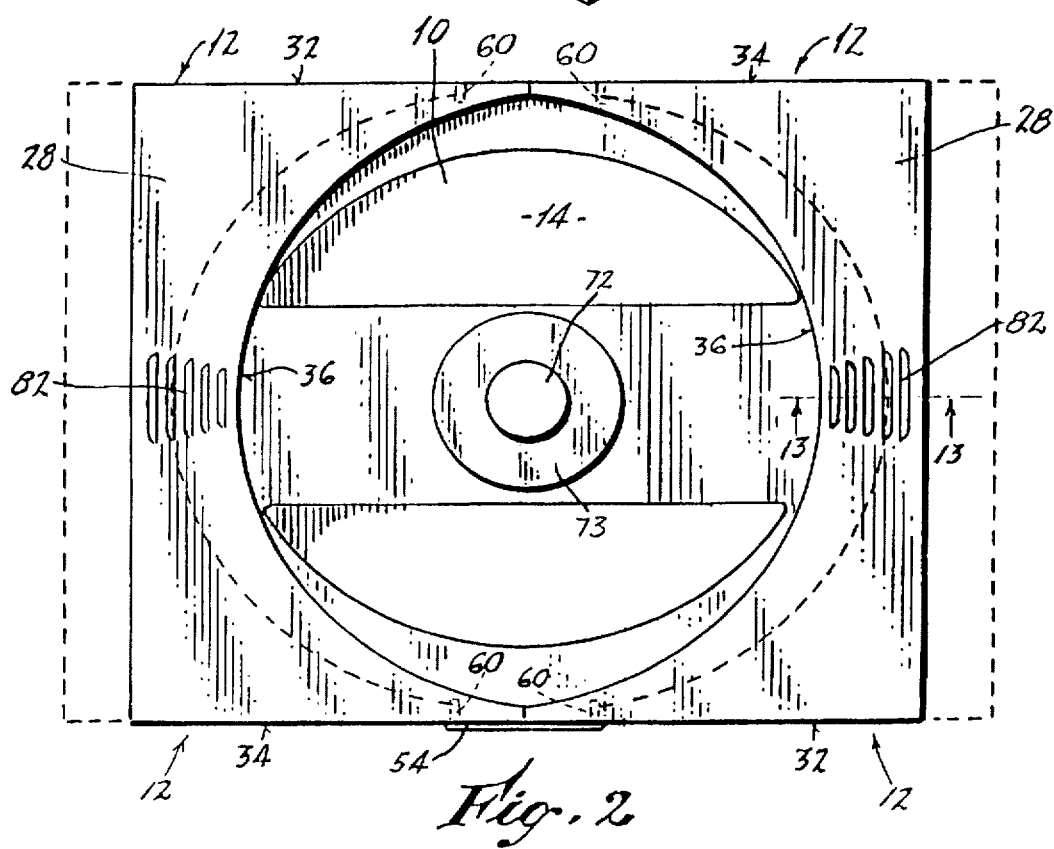
FIG. 2 is a top plan view of the CD record case, in closed position.

Referring first to FIGS. 1 and 2, the tray component comprises a rigid molded plastic box-like part or tray 10 which carries in a slidable arrangement, two rigid identical plastic cover pieces 12. The tray 10, FIG. 3, is in the form of a low, open-top flat box having a rectangular bottom wall 14 and a plurality of low side walls 16, 18, 20, 22, 24 and 26. The walls 16 and 18 are in alignment with each other, as are the walls 22 and 24.

Since the two cover members 12 are identical to each other, only the left-most member 12 as viewed in FIG. 2 will be described in detail. Referring to FIGS. 5–7, the cover member shown therein can be economically injection molded of styrene or other suitable plastic, comprising essentially a top or front panel 28 which has somewhat of a U-shape or yoke configuration, with three straight edges 30, 32 and 34, and a curved edge 36 ending in cusps 37, the edge 36 being disposed opposite the straight edge 30. The straight edges 30, 32 and 34 form a "U" shape, and the edges 32 and 34 have free ends. The edges also have narrow flanges 35, 38 and 40 respectively at the under side of the panel portion 28 as seen in FIGS. 6–9. The flange 38 is shown in larger detail in FIG. 7. Also, the two flanges 38 and 40 have the same widths as each other and are spaced apart a distance such that the tray 10 as measured between the side walls 16, 18 and 22, 24 can slidably snugly fit between the flanges 38 and 40. These flanges are provided with slides or rails 42, 44 which underlie the bottom wall 14 of the tray 10, thereby to effect a sliding fit of the two cover members 12 on the tray 10, FIGS. 1 and 2.

Incidental removal of the cover members 12 from their sliding positions on the tray 10 is prevented by stop shoulders 46, FIGS. 5 and 8, on the underside of the panels 28, which interact with the top edges of the side walls 20 and 26 of the tray 10. The purpose is to provide a positive stop and lock when opening the case, so that the cover pieces 12 do not come off of the tray 10.

FIGS. 5 and 8 also show detent nibs or protuberances 48 and 50 at the underside of the panel 28 of the cover member 12, to control the positioning of the cover member. The closed condition of the CD package is shown in FIG. 2. The nibs 50, FIG. 8, are engaged with the top edge of the side wall 26 of the tray and constitute yieldable detents which normally hold the cover members 12 closed. The user exerts a separating pull on the cover members 12 in opposite directions to open the case, thereby overcoming the restraint of the nibs 50 and 48. The left-most cover piece 12 moves to the left, and the right-most cover piece 12 moves to the right, these pieces assuming the positions shown in FIG. 1. Here the nibs 48 have been forced to the left, past the top edge of the side wall 26 (shown dotted in FIG. 8) and the top edge of the side wall 26 has come to a stop in engagement with the special positive stop shoulders 46. Both of the cover pieces 12 can now be as shown in the dotted-line positions of FIG. 2.

As seen in FIG. 2, the facing curved edges 36 of the cover pieces 12 have a larger radius than the radius of the recess in the insert member to be described below, whereby the cover pieces need not be opened to the extent that would otherwise be required if all of the radii were to be the same, in order to provide full access for the removal or insertion of the CD.

FIGS. 1 and 2 also show a tamper-evident strip 54 which has been applied to adjacent flanges 38, 40 of the respective cover pieces 12. The strip 54 prevents opening of the package unless it is torn at the joint between the cover pieces to separate it into two parts.

The present invention provides a unique nest formation or means for nesting and properly positioning the CD record, resulting in advantages in presenting copy and historical data relating to the recording, and also in a saving of material. This means involves the provision of a novel insert or nest member 58 for the tray 10. FIGS. 10 and 11, and in the provision of novel, shoulders 60 having ramp portions 62 in the tray 10, FIGS. 1-4. In accordance with the present invention, the shoulders 60 centralize a CD record 61 shown in dotted fragmentary representation in FIG. 1, such that peripheral edge portions of the CD record 61 are maintained spaced from the sides of the tray by such shoulders 60 at all times, and additionally the radially inner, recording surface of the CD record is spaced from all parts of the insert member 58, so as to avoid physical contact therewith, and minimize the possibility of damage to the CD record, from scratching or abrasion by the insert member per se.

The insert or nest member 58 having the nest formation can be formed, as by molding, of inexpensive plastic or paper-like material so as to have a rectangular configuration that can be easily dropped into the tray 10. As shown in FIGS. 10, 11 and 13, the insert member 58 has raised portions 64 extending along two opposite side edges 66, such raised portions defining oppositely-disposed, facing, curved semi-cylindrical shoulders 68 adapted to receive between them a CD record. The shoulders 68 form a recess, and as noted above the radius of curvature of the shoulders 68 is less than the radius of curvature of the curved edges 36 of the cover pieces. Inwardly of the shoulders 68 is a flat, central body portion comprising two spokes 70 extending outwardly from a stepped center hub or gripper 72 which snugly fits into the center portion of a CD record, and a land portion 73 which holds the record raised from the spokes 70. The body of the insert member 58 also comprises a flat circular portion 74 which joins together the raised portions 64 in the form of an inner periphery. With such construction there is formed a central circular opening 75 slightly smaller than the periphery of a compact disk record. The portions 70 can be thought of as spokes in the circular opening 75. The opening results in a considerable saving of material, as well as enabling any advertising copy or ornamentation that might be disposed under the insert to be viewed from the front of the case, when there is no CD record stored in the case. The insert member 58 can be chosen of a material which is protective of the CD record, and by its very shape it cradles or nests the record in a protective manner, so as to avoid surface contact with the recording area of the CD record, as noted above.

Further, in accordance with the invention, the flat connector portion 74 of the insert is provided with clearance slots 76 through which the shoulders 60 and ramps 62 of the tray 10 can project, for engagement with the peripheral edge of the CD record, to centralize the latter. The ramps 62 serve an important function during insertion of the record, since they will cam upward the record edge if the user inserts the record angularly. Preferably the shoulders 60 engage the CD record solely at diametrically opposite edges, or at spaced apart locations on the CD record periphery, to provide optimal support along a minimal area of engagement of the periphery.

The insert member 58, when molded of suitable material such as plastic, can be economically provided with a rubberized finish on its surfaces. This provides an excellent protection for the highly finished, vulnerable surfaces of CD records.

The upper surfaces of the raised portions 64 of the insert member 58 can be provided with depressions or grooves 80 which give clearance spaces for the nibs 48, 50 and stop shoulders 46 at the undersides of the cover members 12.

Convenient finger grip ridges 82 are provided on the cover member 12, to facilitate the opening and closing of the same.

Figure 14:
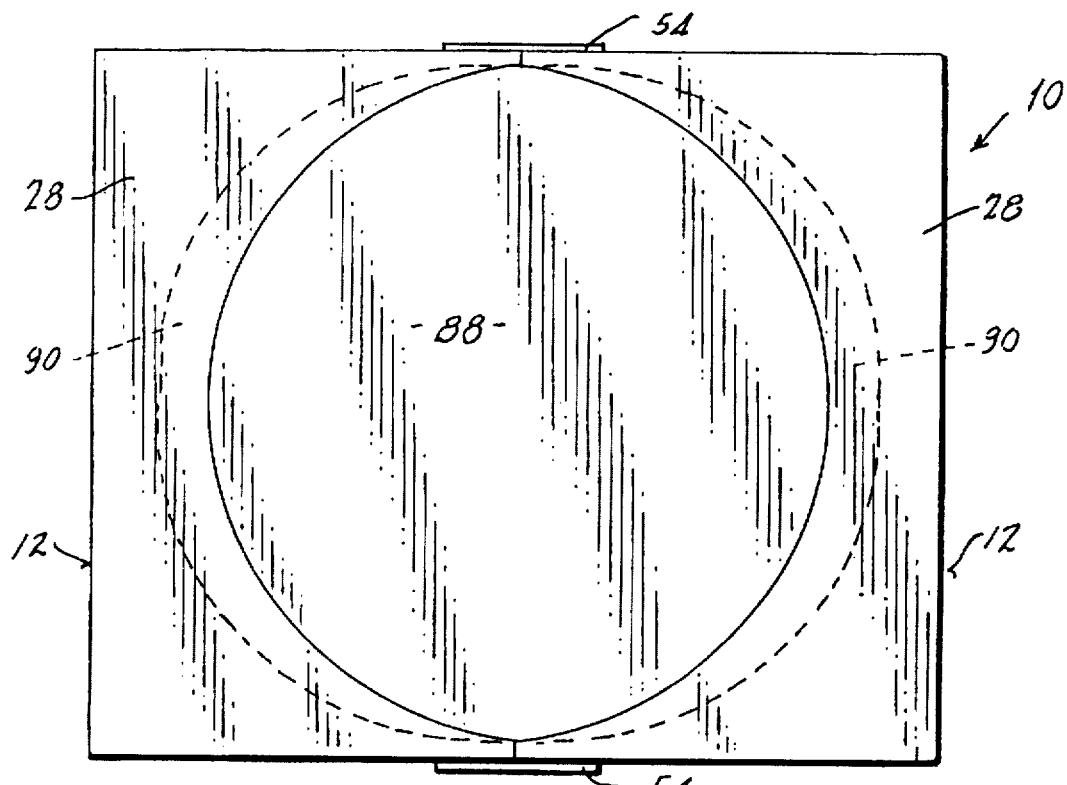
FIG. 14 is a top plan view of the CD case of the invention, adapted for use in mailing.
Figure 15:
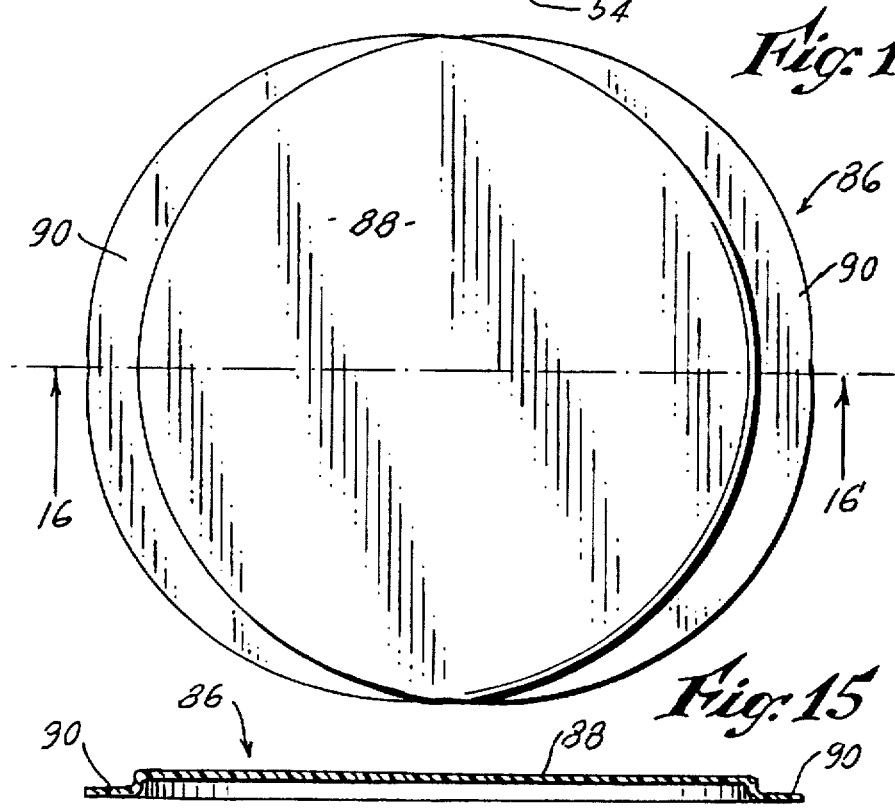
FIG. 15 is a top plan view of a filler panel as used in the case of FIG. 14, for mailing purposes.
Figure 16:
FIG. 16 is a section taken on the line 16—16 of FIG. 15.

FIGS. 14, 15 and 16 depict the present CD case as adapted for mailing purposes. In FIGS. 15 and 16 a circular insert panel 86 is shown, having a raised circular central portion 88 bounded by crescent-shaped flanges 90 which can fit under the top panel portions 28 of the cover pieces 12 when the latter are in their closed positions as shown in FIG. 14. The cover pieces 12 are secured against opening by the tamper-evident pieces of tape 54. The insert panel 86 covers and protects the contents of the CD case, and is removed by the user and discarded when the tapes 54 are first removed.

FIG. 17 is a fragmentary section of the tray 10 having the bottom wall 14, and adapted for use with a compact disk record 61 but with the omission of the insert member 58. In contrast thereto, with the arrangement of FIG. 17, the compact disk record is directly supported by a plurality of shoulders 60, and associated ramps 62.

As seen in FIG. 1, each shoulder 60 is perpendicular to the flat bottom wall 14 of the tray, and has an inwardly facing abuttable surface designated 60a, adapted to be engaged by the circumferential, circular edge 61a of the compact disk record as in FIG. 17. The record is thereby centralized in the tray, with the circular edge being spaced from the side walls of thereof, as in FIG. 1.

By the invention, each ramp 62 has a lowermost portion 62a and an uppermost portion 62b, the lowermost portion merging gradually and directly into the flat bottom wall 14. In addition, the uppermost portion 62b merges gradually and directly into the respective inwardly facing abuttable surface 60a of the centralizing shoulder 60 whereby the compact disk record when positioned in the tray, is supported substantially at the juncture, designated 63, of the ramp portion 62b and respective centralizing shoulder 60. Due to the fact that the circular edge 61a of the CD record 61 engages the centralizing shoulder immediately adjacent the juncture of each shoulder and ramp, the CD record is at all times, spaced above the lowermost portion 62a of each ramp, as well as being spaced above the upper surface of the bottom wall 14.

As shown in FIG. 1, the ramps 62a comprise two pairs, the ramps of each pair being disposed in side-by-side relation, and each ramp being diametrically opposed to another ramp with respect to the CD record when the latter is inserted into the tray. Also, at least one of the ramps 62, at its lowermost portion 62a, is slidably engaged by the circumferential edge 61a of the record 61 when the latter is inserted into the tray from a tilted position, and the circumferential edge thereof slides up the lowermost portion 62a of the ramp 62 and thereafter up the uppermost portion 62b of the ramp and arrives at the juncture 63 of the ramp with its respective shoulder 60 and into engagement with the respective abuttable surface 60a as the record becomes seated in the tray.

With such an arrangement, insertion of the CD record is simplified, since there are no ledges or surface discontinuities between the upper surface of the wall 14 and the lowermost portion 62a of each ramp. This is in contrast to prior arrangements wherein discrete support shoulders were provided, and prominent steps or abutments existed between the support surfaces of the shoulders and the corresponding bottom wall of the tray.

As a consequence, with the arrangement of the present invention, the CD record can be slid into the tray at an angle, with a leading portion of the edge 61a of the CD record sliding along the bottom wall 14 of the tray until it arrives at the lowermost portion 62a of the ramp, at which time it merely rides up the portions 62a and 62b in succession, and comes to rest at the surface 60a. The disk is then in position to be lowered into the tray so that all four shoulders support the disk, two shoulders at one location of the circumferential edge of the CD record, and the other two shoulders at the diametrically opposite location of the circumferential edge thereof.

With the disclosed mounting arrangement, it can be seen in FIG. 17, that the edge of the CD record is supported above the junctures 63 of each ramp and at the corresponding abuttable surfaces 60a of the respective shoulder 60.

From the above it can be seen that I have provided a novel and improved case for a CD record, which is simple in its structure, and which features significant ease of use for the consumer, requiring only a simple grasp and slide motion. There are no hinges to break, and no special manipulations requiring unusual manual dexterity by the consumer, as with many prior constructions.

The case is characterized by both freedom from malfunction and long life expectancy.

The disclosed device is thus seen to represent a distinct advance and improvement in the field of CD records.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A case for a compact disk record, comprising in combination:
   a) a flat, rectangular tray having low oppositely-disposed side walls,
   b) a nest member in said tray, having a nesting formation which is adapted to receive broadside and hold a compact disk record,
   c) a pair of cover members carried by said tray at one side thereof, and
   d) cooperable slide mounting means on said tray and one of said cover members, mounting said one cover member for movement in a plane which is common with the other of said cover members, said mounting means enabling said one cover member to be moved in said common plane toward and away from said nest formation of the nest member,
   e) said cover members together having a pair of edges that face each other,
   d) portions of the facing edge of said one member overlying areas of the nest formation of the nest member when the cover member is closest to said nest formation, thereby to hold captive a disk record that has been previously inserted in the nest formation.

2. A case for a compact disk record as set forth in claim 1, wherein:
   a) said nest formation has a centrally-disposed gripper to engage and hold the center portion of a compact disk, and has spaced-apart spokes that connect said gripper to the remainder of the nest formation.

3. A case for a compact disk record as set forth in claim 1, wherein:
   a) said one cover member an d tray have cooperable detent means for yieldably holding the cover member in an open position un covering the said nest formation.

4. A case for a compact disk record as set forth in claim 1, wherein:
   a) said one cover member and tray have cooperable detent means for yieldably holding the cover member in its closed position closest to the said nest formation.

5. A case for a compact disk record as set forth in claim 3, wherein:
   a) said detent means comprises a top edge of one side wall of the tray, and a protuberance on the said one cover member, engageable with said top edge.

6. A case for a compact disk record as set forth in claim 3, wherein:
   a) said detent means comprises a top edge of one side wall of the tray, and a pair of protuberances on the said one cover member, engageable with said top edge.

7. A case for a compact disk record as set forth in claim 4, wherein:
   a) said detent means comprises a top edge of one side wall of the tray, and a protuberance on the said one cover member, engageable with said top edge.

8. A case for a compact disk record as set forth in claim 4, wherein:
   a) said detent means comprises a top edge of one side wall of the tray, and a pair of protuberances on the said one cover member, engageable with said top edge.

9. A case for a compact disk record as set forth in claim 8, wherein:
   a) said cover member has a slab-shaped configuration comprising a top panel portion bounded by, on the one hand, three low side walls which together form a "U" with two free ends, and on the other hand by a crescent-shaped edge the cusps of which meet the two free ends of the side walls.

10. A case for a compact disk record as set forth in claim 8, wherein:
   a) said configuration of the cover member has a yoke portion disposed midway between two of said three side walls, and
   c) said protuberances being carried by the top panel portion of the cover member and being located on opposite sides of the center of said yoke portion.

11. A case for a compact disk record as set forth in claim 1, wherein:
   a) said nest member has a centered circular opening slightly smaller than the periphery of a compact disk record.

12. A case for a compact disk record as set forth in claim 2, wherein:
   a) the nest formation has only two of said spokes.

13. A case for a compact disk record as set forth in claim 1, wherein:
   a) the edges of the cover members which face each other form a circular configuration when the cover members are closest to each other.

14. A case for a compact disk record as set forth in claim 10, wherein:
   a) said one cover member has finger grip ridges on the yoke portion thereof.

15. A case for a compact disk record, comprising in combination:
   a) a flat, rectangular molded plastic tray having low, oppositely-disposed side walls, said tray being adapted to receive broadside and hold said compact disk record,
   b) openable cover means comprising a pair of oppositely-movable slide cover members carried by said tray and operable to provide access to the latter,
   c) said cover members having oppositely disposed curved edges defining a central access opening at the top of the tray,
   d) said cover means when closed preventing removal of the compact disk record from the tray, and
   e) a removable insert panel having edge portions disposed under the said curved edges, said insert panel closing the central opening at the top of the tray to protect the contents of the tray for mailing purposes.

16. A case for a compact disk record, comprising in combination:
   a) a flat, rectangular molded plastic tray having a substantially flat bottom wall, and low, oppositely-disposed side walls, said tray being adapted to receive broadside and hold said compact disk record,
   b) said tray having in it a plurality of integrally-molded spaced-apart, upwardly vertically extending centralizing shoulders which are perpendicular to the flat bottom wall of the tray, and which have inwardly facing abuttable surfaces that are located so as to abuttingly engage at right angles, solely the circumferential, circular edge of the disk record that is placed in the tray, thereby to positively centralize the record in the tray with said circular edge of the record being spaced from the side walls of the tray,
   c) openable cover means carried by said tray to provide access to the latter,
   d) said cover means when closed preventing removal of the compact disk record from the tray,
   e) said flat bottom wall having ramps whose lowermost portions merge gradually and directly into said flat bottom wall and whose uppermost portions merge gradually and directly into said respective inwardly facing abuttable surface of the centralizing shoulders whereby the compact disk record when positioned in the tray, is supported substantially at the junctures of the ramps and respective centralizing shoulders, with the circular edge of the record engaging the centralizing shoulders immediately adjacent the junctures of such shoulders and ramps so as to be spaced above the lowermost portion of each ramp,
   f) said ramps comprising two pairs, the ramps of each pair being disposed in side-by-side relation, and each ramp being diametrically opposed to another ramp with respect to the disk record when the latter is inserted into the tray,
   g) at least one of said ramps, at its lowermost portion, being slidably engaged by the circumferential edge of the record when the latter is inserted into the tray from a tilted position, said circumferential edge thereof sliding up the lowermost portion of the ramp and thereafter up the uppermost portion of the ramp and arriving at the juncture of the ramp with its respective shoulder and into engagement with the respective abuttable surface as the record becomes seated in the tray.

* * * * *